United States Patent
Kanda

(10) Patent No.: US 11,320,679 B2
(45) Date of Patent: May 3, 2022

(54) DISPLAY DEVICE WITH DETECTION CIRCUIT

(71) Applicant: Sharp Kabushiki Kaisha, Sakai (JP)

(72) Inventor: Keisuke Kanda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/324,160

(22) Filed: May 19, 2021

(65) Prior Publication Data

US 2021/0364831 A1 Nov. 25, 2021

Related U.S. Application Data

(60) Provisional application No. 63/027,985, filed on May 21, 2020.

(51) Int. Cl.

| G02F 1/13 | (2006.01) |
|---|---|
| G02F 1/1345 | (2006.01) |
| G09G 3/36 | (2006.01) |
| G09G 3/00 | (2006.01) |

(52) U.S. Cl.
CPC ........ *G02F 1/1309* (2013.01); *G02F 1/13452* (2013.01); *G09G 3/006* (2013.01); *G09G 3/36* (2013.01); *G09G 2330/12* (2013.01)

(58) Field of Classification Search
CPC ......... G09G 2330/08–12; G09G 3/006; G09G 3/36; G09G 3/30–3696; G09G 2300/04–0895; G02F 1/1309; G02F 1/13452

See application file for complete search history.

(56) References Cited

U.S. PATENT DOCUMENTS

| 2011/0122105 A1* | 5/2011 | Itoh ..................... G02F 1/13452 345/204 |
|---|---|---|
| 2016/0370613 A1 | 12/2016 | Li et al. |
| 2019/0116672 A1* | 4/2019 | Zhao ................. G01R 31/2818 |

FOREIGN PATENT DOCUMENTS

| JP | 2007-033742 A | 2/2007 |
|---|---|---|
| JP | 2016-529562 A | 9/2016 |

\* cited by examiner

*Primary Examiner* — Sanghyuk Park
(74) *Attorney, Agent, or Firm* — Keating & Bennett, LLP

(57) ABSTRACT

In a display device including a connection portion pressure-bonded with an anisotropic conductive film and an FPC, a closed circuit configured to allow an abnormality, such as a connection failure in the connection portion, or disconnection or a short circuit in a wiring line of the FPC to be detected, is provided separately from a wiring line needed for displaying an image. When an abnormality occurs, a resistance value of the closed circuit changes, and thus a current value of current flowing through the closed circuit changes. As a result, even when an image is displayed, a detection circuit detects a change in a value of voltage applied to the closed circuit and notifies a user, and thus the user can know that an abnormality occurs in the connection portion or the wiring line of the FPC.

13 Claims, 12 Drawing Sheets

DISPLAY DEVICE WITH DETECTION CIRCUIT

BACKGROUND OF INVENTION

Technical Field

The following disclosure relates to a display device, and more particularly to a display device in which a connection failure in a connection portion of a wiring line and disconnection or a short circuit in a flexible printed circuit are detected.

Background Art

In a liquid crystal display device attached to a vehicle body of an automobile, a wiring line formed on a liquid crystal panel that displays an image, and a wiring line formed on a rigid substrate on which an electronic component that generates a signal necessary for displaying an image on the liquid crystal panel, based on an image signal input from the outside and the like are mounted are often connected to each other by using a flexible printed circuit (hereinafter referred to as an "FPC"). The reason is that the FPC being a flexible substrate is bent and made compact such that the liquid crystal display device can be attached to even a small place such as a vehicle body of an automobile.

After a liquid crystal display device that normally operates in an operation test performed before the liquid crystal display device is attached to an automobile is attached to the automobile and delivered to a customer, a display failure may occur when, for example, the entire vehicle body is vibrated or shocked, thermal stress due to a sudden temperature change is applied, an FPC is bent, or the like. When a cause of such a display failure occurs due to connection failure caused by stress continuing to be applied to a connection portion connected with an anisotropic conductive film (hereinafter referred to as an "ACF"), or disconnection of a wiring line formed on the FPC, the liquid crystal display device needs to be removed from the vehicle body and be disassembled in order to confirm the connection failure or the disconnection. However, in a case of automobiles, the liquid crystal display device is often attached to a small place, and thus it takes time and effort to remove the liquid crystal display device from a vehicle body. Further, there is no system in which a user can always monitor a connection state of the connection portion.

Note that, as a method for detecting a failure in a liquid crystal display device, JP 2007-33742 A proposes that a signal is applied from one side of a VCOM wiring line of a liquid crystal panel, and quality of a pressure-bonded state of a wiring line using an ACF is determined from a resistance value determined from a weakening condition of a waveform on an opposite side to the wiring line.

Further, in JP 2016-529562 A, a testing line that becomes a closed loop is disposed around a liquid crystal display in order to detect whether a microcrack is generated in a glass surface of the liquid crystal display, and the testing line is connected to a liquid crystal driver. It is proposed to measure whether the testing line is in a closed circuit by the liquid crystal driver, and determine whether a microcrack is generated in the glass surface of the liquid crystal display.

However, in the invention described in JP 2007-33742 A, when a resistance value is determined in order to determine the quality of the pressure-bonded state of the ACF, a liquid crystal display mode needs to be shifted to a diagnosis mode. Thus, during operation of the liquid crystal display device, a resistance value cannot be detected. In other words, there is a problem that a connection state cannot be diagnosed when an image is displayed. Further, J P 2016-529562 A discloses detection of a microcrack in a liquid crystal panel. However, detection of a connection failure in a connection portion using an ACF, disconnection in a wiring line formed on an FPC, and the like in a liquid crystal display device formed of the liquid crystal panel, the FPC, and a substrate is not disclosed.

SUMMARY OF INVENTION

Thus, in regard to a display device, it is desirable to achieve a display device in which a connection failure in a connection portion using an anisotropic conductive film and a state of a wiring line formed on a flexible printed circuit can be always detected.

(1) A display device according to some embodiments of the present invention, including:

a display panel in which a display portion where a plurality of pixel forming sections are formed and a drive circuit configured to drive the plurality of pixel forming sections are disposed;

a rigid substrate on which an electronic component configured to generate a signal necessary for operating the drive circuit, based on an image signal input from the outside, is mounted; and a flexible printed circuit disposed between the display panel and the rigid substrate, and configured to electrically connect a wiring line formed on the display panel and a wiring line formed on the rigid substrate, wherein the display device further includes a closed circuit formed extending through one, adjacent two, or all connection portions of a first connection portion, a second connection portion, and a third connection portion that electrically connect a wiring line of the rigid substrate and a wiring line of the flexible printed circuit, a wiring line of the flexible printed circuit and a wiring line of the display panel, and a wiring line of the display panel and a terminal of the drive circuit by an anisotropic conductive film sandwiched between electrodes formed on each of the wiring lines and the terminal and thermally pressure-bonded, and a detection circuit configured to determine a measured value of an electrical signal indicating a connection state of the closed circuit by applying voltage having a predetermined value to a disconnection detection circuit connected to the closed circuit, and the detection circuit determines, based on the measured value, whether a state of the closed circuit is in a normal range being preset, and notifies the outside in a case where the detection circuit detects that the measured value is not in the normal range.

According to such a configuration, in the closed circuit including one, two, or more connection portions pressure-bonded with the anisotropic conductive film, a change in measured value of an electrical signal indicating a connection state of the closed circuit can be detected by using a change in resistance value when a connection failure occurs in at least any of the connection portions, or disconnection or a short circuit occurs in the flexible printed circuit that connects the display panel and a wiring line of the rigid substrate. Thus, when a display failure of an image occurs during use of the liquid crystal display device, a connection state of the connection portion of the image display wiring line and a state of the wiring line of the flexible printed circuit can be estimated from a change in measured value of the closed circuit detected by the detection circuit without disassembling the liquid crystal display device. Further, since the closed circuit is provided separately from a circuit for displaying an image, even when the display device displays an image, a user can know a connection failure in the connection portion and a state of the wiring line of the flexible printed circuit from a change in measured value, and can quickly take necessary measures. In such a manner, a connection state of the connection portion connected by using the anisotropic conductive film and a state of the wiring line of the flexible printed circuit can be easily estimated without disassembling the display device.

(2) Further, the display device according to some embodiments of the present invention includes the configuration of (1) described above, wherein, in the disconnection disconnection detection circuit in which an internal resistor having a known resistance value and the closed circuit are connected in series, the measured value is a value of voltage applied to the closed circuit in a case where the voltage having the predetermined value is applied to the disconnection detection circuit, and the detection circuit determines a connection state of the closed circuit, based on the value of the voltage applied to the closed circuit.

(3) Further, the display device according to some embodiments of the present invention includes the configuration of (2) described above, wherein the detection circuit determines that a wiring line formed on the flexible printed circuit is short-circuited in a case where the value of the voltage applied to the closed circuit is less than a lower limit value of the normal range, and determines that at least any of the connection portions included in the closed circuit of the first to third connection portions or a wiring line formed on the flexible printed circuit is disconnected or is about to be disconnected in a case where the value of the voltage is greater than an upper limit value of the normal range.

(4) Further, the display device according to some embodiments of the present invention includes the configuration of (1) described above, wherein, in the disconnection detection circuit in which an internal resistor having a known resistance value and the closed circuit are connected in series, the measured value is a value of current flowing through the closed circuit in a case where the voltage having the predetermined value is applied to the disconnection detection circuit, and the detection circuit determines a connection state of the closed circuit, based on a value of current flowing through the closed circuit.

(5) Further, the display device according to some embodiments of the present invention includes the configuration of (4) described above, wherein the detection circuit determines that at least any of the connection portions included in the closed circuit of the first to third connection portions or a wiring line formed on the flexible printed circuit is disconnected or is about to be disconnected in a case where the value of the current flowing through the closed circuit is less than a lower limit value of the normal range, and determines that the wiring line formed on the flexible printed circuit is short-circuited in a case where the value of the current is greater than an upper limit value of the normal range.

(6) Further, the display device according to some embodiments of the present invention includes the configuration of (1) described above, wherein the closed circuit is a circuit that extends from the rigid substrate to the flexible printed circuit through the first connection portion, and returns to the rigid substrate from the flexible printed circuit.

(7) Further, the display device according to some embodiments of the present invention includes the configuration of (6) described above, wherein the closed circuit is a circuit that further extends from the flexible printed circuit to the display panel through the second connection portion, and returns to the rigid substrate from the display panel.

(8) Further, the display device according to some embodiments of the present invention includes the configuration of (7) described above, wherein the closed circuit is a circuit that further extends from the display panel to the drive circuit through the third connection portion, and returns to the rigid substrate from the drive circuit.

(9) Further, the display device according to some embodiments of the present invention includes the configuration of (1) described above, wherein the closed circuit is a circuit that extends from the flexible printed circuit to the display panel through the second connection portion, and returns to the flexible printed circuit from the display panel.

(10) Further, the display device according to some embodiments of the present invention includes the configuration of (9) described above, wherein the closed circuit is a circuit that further extends from the display panel to the drive circuit through the third connection portion, and returns to the display panel from the drive circuit.

(11) Further, the display device according to some embodiments of the present invention includes the configuration of (1) described above, wherein the closed circuit is a circuit including at least two or more closed circuits of a first closed circuit that extends from the rigid substrate to the drive circuit through the first connection portion, the flexible printed circuit, the second connection portion, the display panel, and the third connection portion, and returns to the rigid substrate from the drive circuit, a second closed circuit that extends from the rigid substrate to the display panel through the first connection portion, the flexible printed circuit, and the second connection portion, and returns to the rigid substrate from the display panel, and a third closed circuit that extends from the rigid substrate to the flexible printed circuit through the first connection portion, and returns to the rigid substrate from the flexible printed circuit.

(12) Further, the display device according to some embodiments of the present invention includes the configuration of (1) described above, wherein the detection circuit outputs occurrence of an abnormality to the outside in a case where the detection circuit detects that the measured value of the electrical signal is not in the normal range.

(13) Further, the display device according to some embodiments of the present invention includes the configuration of (1) described above, wherein the detection circuit includes a recording medium configured to record a log configured to notify that an abnormality occurs in a case where the detection circuit detects that the measured value of the electrical signal is not in the normal range.

These and other objects, features, aspects, and advantages of the present invention will become more apparent from the following detailed description of the present invention with reference to the accompanying drawings.

DESCRIPTION OF EMBODIMENTS

Embodiments will be described below with reference to the accompanying drawings.

1. First Embodiment

1.1 Overall Configuration

Figure 1:
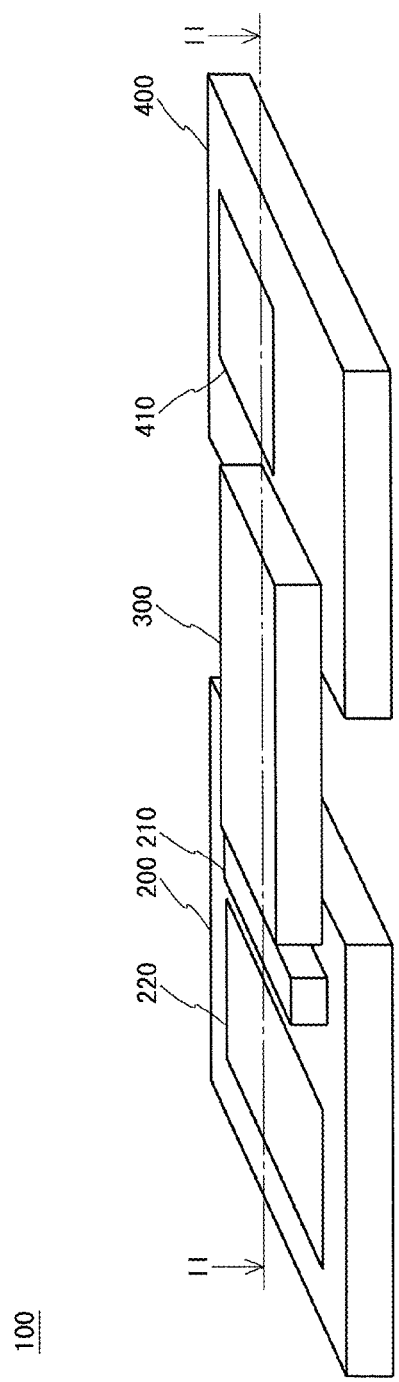
FIG. 1 is a diagram illustrating an overall configuration of a liquid crystal display device according to a first embodiment.
Figure 2:
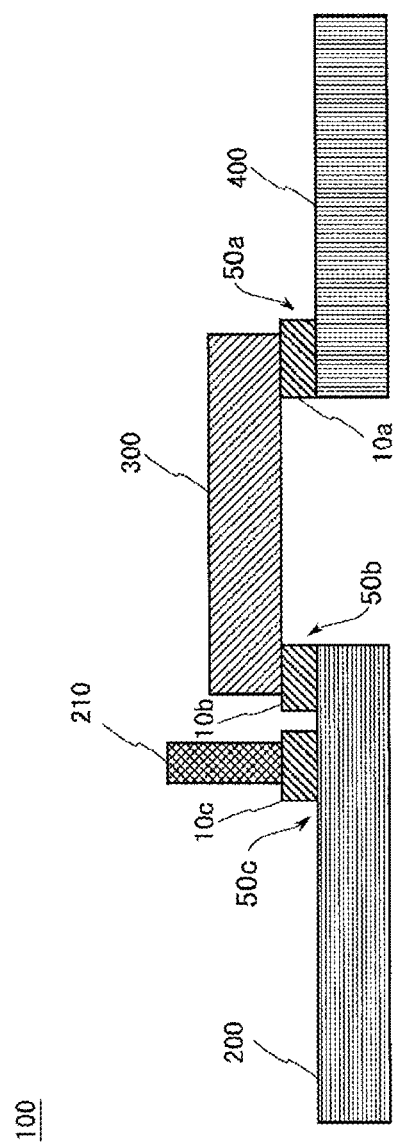
FIG. 2 is a cross-sectional view of the liquid crystal display device taken along a cutting line II-II illustrated in FIG. 1.

FIG. 1 is a diagram illustrating an overall configuration of a liquid crystal display device 100 according to a first embodiment, and FIG. 2 is a cross-sectional view of the liquid crystal display device 100 taken along a cutting line II-II illustrated in FIG. 1. As illustrated in FIG. 1, the liquid crystal display device 100 includes a liquid crystal panel (also referred to as a "display panel") 200 that displays an image, a substrate (also referred to as a "rigid substrate") 400 on which an electronic component that generates a necessary signal for displaying an image, based on an image signal input from the outside, and the like are mounted, and an FPC 300 that connects a wiring line formed on the liquid crystal panel 200 to a wiring line formed on the substrate 400, and the wiring line of the liquid crystal panel 200 and the wiring line of the substrate 400 are connected to each other with the FPC 300.

A display portion 220 that displays an image and a driver (also referred to as a "drive circuit") 210 for driving a plurality of pixel forming sections (not illustrated) formed on the display portion 220 are disposed on the liquid crystal panel 200. The driver 210 is connected to a wiring line (not illustrated) formed on the liquid crystal panel 200 with an ACF (not illustrated). Further, a wiring line (not illustrated) is also formed on the substrate 400, and an electronic component (not illustrated) and a detection circuit 410 for detecting disconnection or a short circuit in a closed circuit described later are disposed. The FPC 300 is a substrate formed of a flexible film, and a wiring line (not illustrated) for connecting the wiring line of the substrate 400 and the wiring line of the liquid crystal panel 200 is formed on a surface of the FPC 300.

As illustrated in FIG. 2, in the liquid crystal display device 100, the liquid crystal panel 200, the FPC 300, and the substrate 400 are connected side-by-side in order from the left to the right. An electrode of the driver 210 and an electrode formed on the wiring line of the liquid crystal panel 200 are pressure-bonded with an ACF 10c. The electrode of the wiring line formed on the liquid crystal panel 200 and an electrode of the wiring line formed on the FPC 300, and an electrode of the wiring line formed on the substrate 400 and the electrode of the wiring line formed on the FPC 300 are electrically connected to each other by being pressure-bonded with an ACF 10b and an ACF 10a sandwiched therebetween, respectively. As a result, a signal generated by the electronic component disposed on the substrate 400, based on an image signal input from the outside, is supplied to the driver 210 disposed on the liquid crystal panel 200 via the ACFs 10a to 10c. The driver 210 generates a scanning signal and a data signal, based on the given signal, and supplies the scanning signal and the data signal to a scanning line and a data line of each pixel forming section at a predetermined timing. In this way, an image according to the image signal is displayed on the display portion 220.

Each of the ACFs 10a to 10c described above is an adhesive film in which conductive particles are dispersed in an adhesive formed of a thermosetting resin, and is pressurized while being heated in a state sandwiched between an electrode of the electronic component and an electrode formed on the wiring line, or between electrodes formed on the wiring lines to be connected. In this way, in a region sandwiched between the upper and lower electrodes, a conductive path is formed by the conductive particles dispersed inside the ACFs 10a to 10c being in contact with each other, and, at the same time, in a region that is not sandwiched between the electrodes, the conductive particles of the ACF remain dispersed, and thus insulating properties are maintained. In such a manner, when the ACF is used, the wiring lines can be electrically connected together by sandwiching the ACF between the electrode of the wiring line and the electrode of the wiring line that differ from each other as described above. In the following description, for simplification of description, it is described that the wiring lines are electrically connected to each other by sandwiching the ACF between the wiring line and the wiring line.

Figure 3:
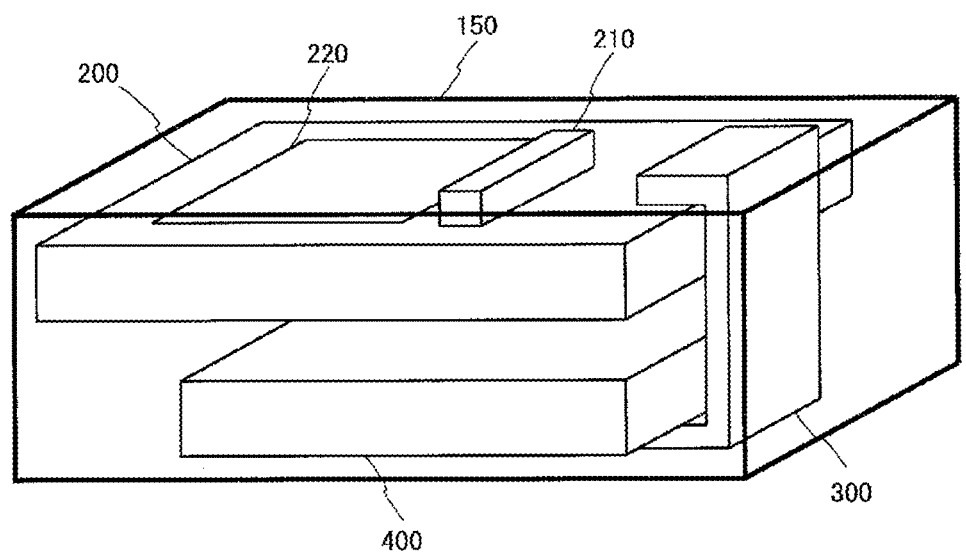
FIG. 3 is a diagram illustrating the liquid crystal display device in which a liquid crystal panel is layered above a substrate by bending a FPC of the liquid crystal display device illustrated in FIG. 1.

FIG. 3 is a diagram illustrating the liquid crystal display device 100 in which the liquid crystal panel 200 is layered above the substrate 400 by bending the FPC 300 of the liquid crystal display device 100 illustrated in FIG. 1. As illustrated in FIG. 3, the liquid crystal display device 100 is housed in a housing 150 with the FPC 300 being bent. As a result, only the display portion 220 of the liquid crystal display device 100 is visually recognized from the outside, and the other portion is protected by the housing 150, and thus the entire liquid crystal display device 100 cannot be visually recognized from the outside.

1.2 Configuration of Detection Circuit and Closed Circuit

Figure 4:
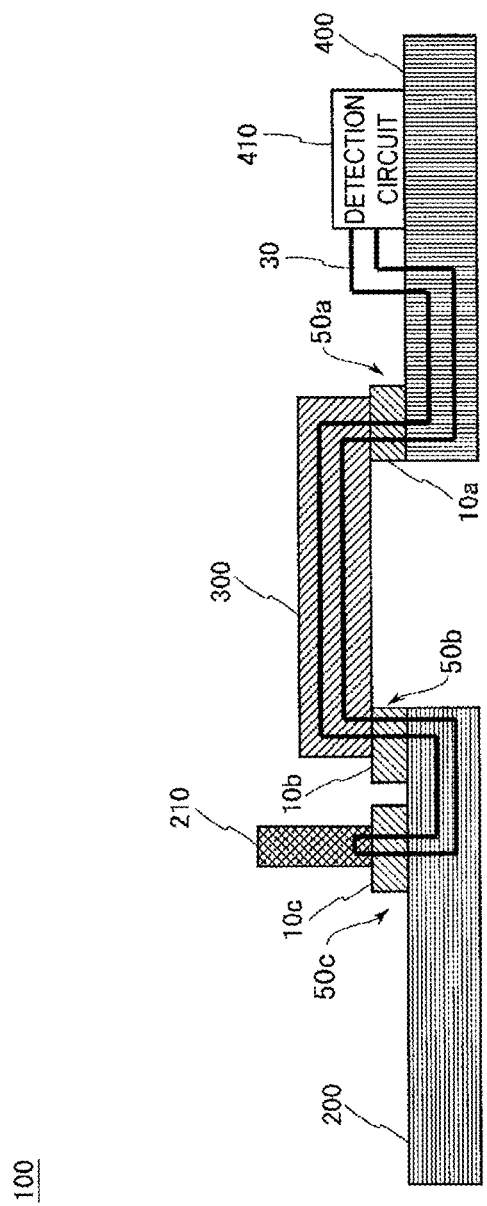
FIG. 4 is a diagram illustrating a wiring line of a closed circuit formed in the liquid crystal display device.

A configuration of a closed circuit 30 in which a connection state in a connection portion of a wiring line can be monitored even when an image is displayed in the liquid crystal display device 100 as described above will be described. FIG. 4 is a diagram illustrating a wiring line of the closed circuit 30 formed in the liquid crystal display device 100. As illustrated in FIG. 4, both ends of the closed circuit 30 are connected to the detection circuit 410 described later. The closed circuit 30 is a circuit that extends to the substrate 400, the FPC 300, the liquid crystal panel 200, and the driver 210 in order from the detection circuit 410 side, and then returns to the substrate 400 again by turning back inside the driver 210. A connection portion that is included in the closed circuit 30 and may change in resistance value includes a connection portion 50a (also referred to as a "first connection portion") in which the wiring line of the substrate 400 and the wiring line of the FPC 300 are pressure-bonded with the ACF 10a, a connection portion 50b (also referred to as a "second connection portion") in which the wiring line of the FPC 300 and the wiring line of the liquid crystal panel 200 are pressure-bonded with the ACF 10b, and a connection portion 50c (also referred to as a "third connection portion") in which the wiring line of the liquid crystal panel 200 and the electrode of the driver 210 are pressure-bonded with the ACF 10c. Thus, the closed circuit 30 extends through each of the connection portions 50a to 50c one time in a path from the substrate 400 toward the liquid crystal panel 200 and a path that returns to the substrate 400 again by turning back.

In the present embodiment, to monitor, in a wiring line (not illustrated) (also referred to as an "image display wiring line") needed for displaying an image in the liquid crystal display device 100, whether a connection failure occurs in the connection portions 50a to 50c, or disconnection or a short circuit occurs in the wiring line of the FPC 300, the closed circuit 30 having the same structure is provided near the wiring line When a connection failure occurs in the connection portions 50a to 50c of the closed circuit 30, or disconnection or a short circuit occurs in the wiring line of the FPC 300, a resistance value of the closed circuit 30 changes from a resistance value in a normal condition. Accordingly, a value of voltage applied to the closed circuit 30 is determined by causing a current to flow through the closed circuit 30, and the voltage value is compared with an voltage value when the closed circuit 30 is normal. Based on the result, it is determined whether an abnormality occurs in the closed circuit 30, and a state of the image display wiring line is estimated.

Figure 5:
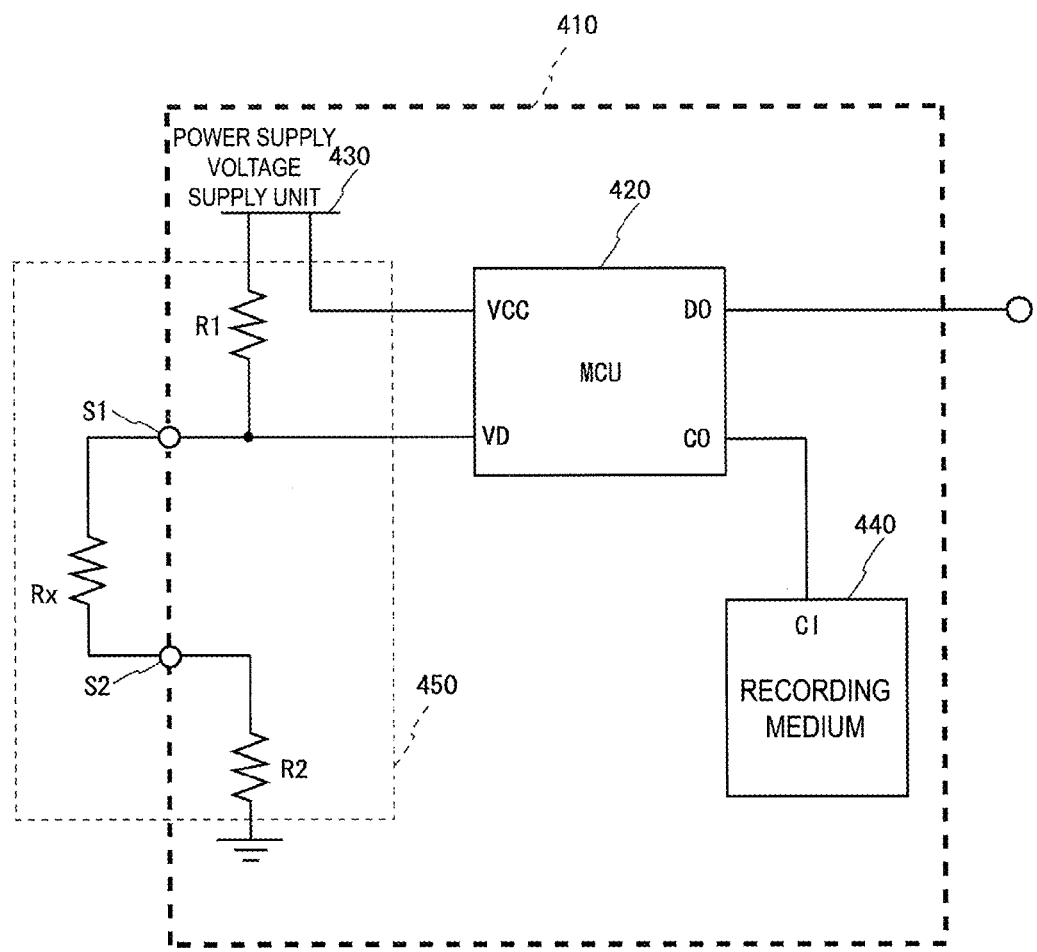
FIG. 5 is a block diagram illustrating a configuration of a detection circuit used in the present embodiment.

FIG. 5 is a block diagram illustrating a configuration of the detection circuit 410 used in the present embodiment. In the present embodiment, the detection circuit 410 illustrated in FIG. 5 is used for detecting the presence or absence of a connection failure in the connection portions 50a to 50c included in the closed circuit 30. The detection circuit 410 is provided on the substrate 400, and includes a micro controller unit (MCU) 420, a power supply voltage supply unit 430 that supplies a power supply voltage, an internal resistor R1 connected to the power supply voltage supply unit 430, an internal resistor R2 connected to a ground line, and a recording medium 440. The internal resistor R1 and the internal resistor R2 are both resistors having a known resistance value. A terminal S1 and a terminal S2 are provided in the detection circuit 410. In FIG. 5, a pseudo resistor Rx representing the closed circuit 30 is illustrated outside the detection circuit 410. One end of the pseudo resistor Rx is connected to the terminal S1, and the other end is connected to the terminal S2. In this way, a disconnection detection circuit 450 in which the internal resistor R1, the pseudo resistor Rx, and the internal resistor R2 are connected in series is formed between the power supply voltage supply unit 430 and the ground line.

In the disconnection detection circuit 450, when a value of voltage applied to the internal resistor R1 is V1, a value of voltage applied to the pseudo resistor Rx, i.e., the closed circuit 30 is Vx, and a value of voltage applied to the internal resistor R2 is V2, a power supply voltage value Vcc is represented by Equation (1) below.

$$Vcc = V1 + Vx + V2 \tag{1}$$

Thus, a wiring line extending from a voltage measurement terminal VD of the MCU 420 is connected to a connection point between the internal resistor R1 and the pseudo resistor Rx. In this way, the MCU 420 measures the value V1 of the voltage applied to the internal resistor R1, and determines a value of current flowing through the internal resistor R1, i.e., current flowing through the disconnection detection circuit 450. Furthermore, the MCU 420 determines the value Vx of the voltage applied to the pseudo resistor Rx by Equation (2) below.

$$Vx = Vcc - I(R1 + R2) \tag{2}$$

When the liquid crystal display device 100 operates, a power supply voltage is also supplied to the MCU 420, and thus the MCU 420 can continue to measure the value Vx of the voltage Vx applied to the closed circuit 30.

When the voltage value Vx determined in such a manner is greater than an upper limit value Va of a normal range that is preset as a voltage value without an abnormality in the closed circuit 30 or is less than a lower value value Vb, the MCU 420 determines that an abnormality occurs in at least any of the connection portions 50a to 50c included in the closed circuit 30 or a wiring line formed on the FPC 300.

Note that the MCU 420 may notify the outside of the determined voltage value by using inter-integrated circuit (I2C) communication from an output terminal DO. Furthermore, by using the I2C communication, the MCU 420 may record, from a communication terminal CO, a log that notifies occurrence of an abnormality in the closed circuit 30 due to the determined voltage value falling outside the normal range Va to Vb together with an occurrence time of the abnormality, in a communication terminal CI of the recording medium 440 formed of a flash memory and the like provided in the detection circuit 410. Note that a central processing unit (CPU) may be provided instead of the MCU 420. Further, instead of the power supply voltage supply unit 430 that supplies a power supply voltage to the disconnection detection circuit 450 and also to the MCU 420, a voltage supply unit that supplies a voltage having a predetermined voltage value may be provided.

Figure 6:
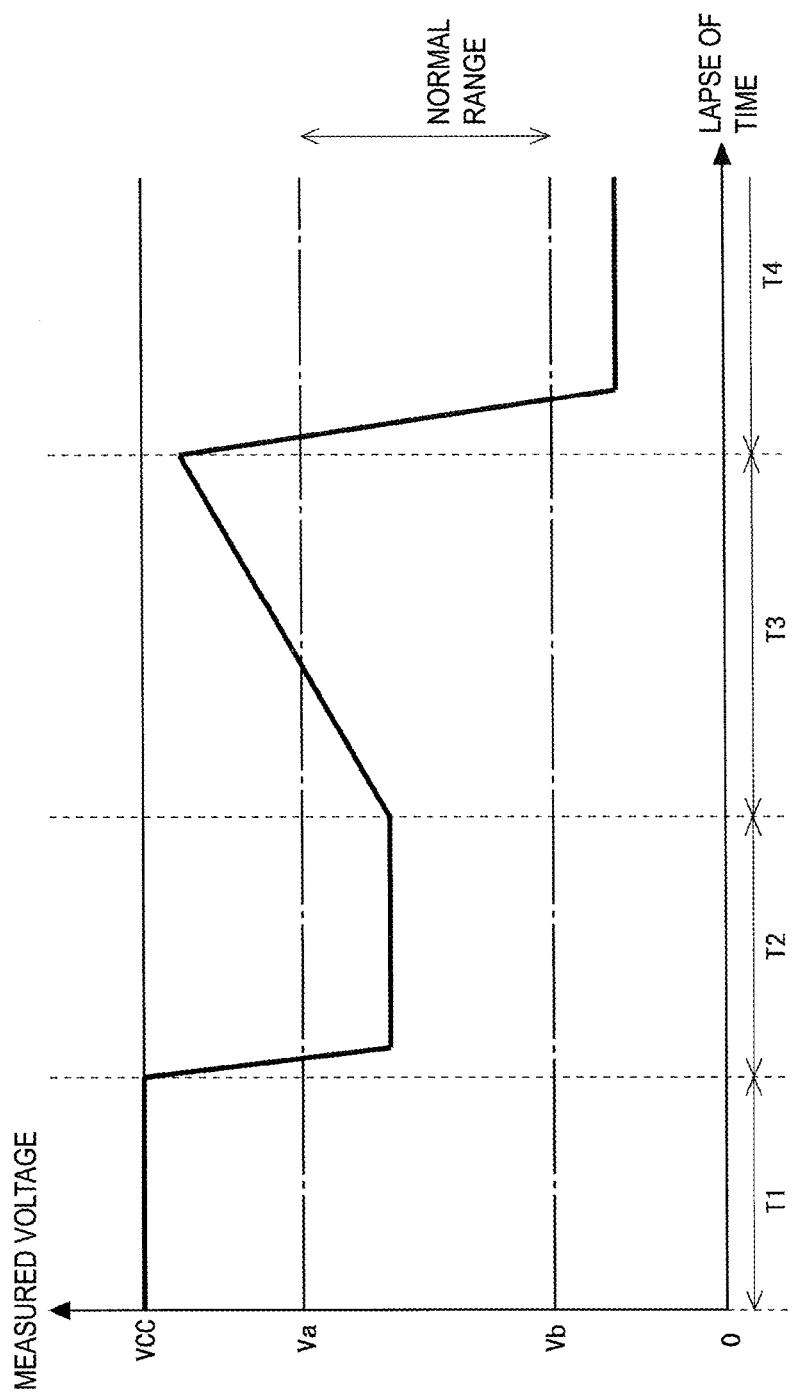
FIG. 6 is a diagram showing a time change in voltage value in a voltage measurement terminal of an MCU.

1.3 Relationship Between Change in Voltage Value and Failure Mode of Closed Circuit FIG. 6 is a diagram showing a time change in voltage value in the voltage measurement terminal VD of the MCU 420. Note that a voltage value of the closed circuit 30 varies within a certain range even when a connection state of the connection portions 50a to 50c is normal. Thus, in FIG. 6, when a range between the upper limit value Va and the lower limit value Vb is a normal range Va-Vb and a determined voltage value of the closed circuit 30 is a value within the normal range Va-Vb, the MCU 420 determines the voltage value to be normal. In contrast, when a voltage value of the closed circuit 30 becomes greater than the upper limit value Va of the normal range, the MCU 420 determines that a connection failure occurs in the connection portion 50a to the third connection portion 50C, or a wiring line of the FPC 300 is disconnected or is about to be disconnected. Further, when a voltage value of the closed circuit 30 becomes less than the lower limit value Vb, it is determined that wiring lines of the FPC 300 in the closed circuit 30 are short-circuited due to foreign matter entering between the wiring lines, for example. Note that, in the present specification, a connection state of the connection portion 50a to the connection portion 50c, and a state of the wiring line of the FPC 300 may be collectively referred to as a "connection state of the closed circuit".

Four periods T1 to T4 will be described with reference to FIG. 6. First, in the period T1, a voltage value of the closed circuit 30 is the same as a voltage value of the power supply voltage. This results in determination that at least any of the respective connection portions 50a to 50c between the FPC 300 and the substrate 400, the FPC 300 and the liquid crystal panel 200, and the liquid crystal panel 200 and the driver 210 is disconnected or the wiring line of the FPC 300 is disconnected. In this way, it is estimated that disconnection also occurs in the same location in the image display wiring line as that in the closed circuit 30.

In the period T2, the voltage value of the closed circuit 30 is in the normal range Va-Vb between the upper limit value Va and the lower limit value Vb. This results in determination that a connection failure does not occur in any of the connection portions 50a to 50c between the FPC 300 and the substrate 400, the FPC 300 and the liquid crystal panel 200, and the liquid crystal panel 200 and the driver 210, and the wiring line of the FPC 300 is also not disconnected or short-circuited. In this way, it is estimated that the image display wiring line is also normal.

In the period T3, the voltage value of the closed circuit 30 gradually increases, and rises beyond the upper limit value Va of the normal range to a value close to the voltage value of the power supply voltage. This results in determination that a connection state becomes worse in at least any of the connection portions 50a to 50c during operation of the liquid crystal display device 100 or the wiring line of the FPC 300 is about to be disconnected, and there is a possibility that disconnection may occur in the future. In this way, it is estimated that there is a possibility that disconnection may also occur in the same location in the image display wiring line in the future as that in the closed circuit 30.

In the period T4, the voltage value of the closed circuit 30 is less than the lower limit value Vb of the normal range. This results in determination that wiring lines formed on the FPC 300 are short-circuited therebetween due to adhesion of foreign matter or the like. In this way, it is estimated that a short circuit also occurs in the same location in the image display wiring line as that in the closed circuit 30.

1.4 Effects

According to the present embodiment, even during operation of the liquid crystal display device, when the MCU 420 monitors a voltage value of the closed circuit 30 and determines that there is an abnormality, the MCU 420 notifies a user of a content of the abnormality. Specifically, when a voltage value of the closed circuit 30 is equal to a voltage value of the power supply voltage, the MCU 420 determines that at least any of the connection portions 50a to 50c is disconnected, or the wiring line of the FPC 300 is disconnected. Further, when a voltage value of the closed circuit 30 is greater than the upper limit value Va of the normal range, it is determined that at least any of the connection portions 50a to 50c is about to be disconnected due to a connection failure, or the wiring line of the FPC 300 is about to be disconnected. On the other hand, when a voltage value of the closed circuit 30 is less than the lower limit value Vb of the normal range, it is determined that the wiring line of the FPC 300 is short-circuited. The user can estimate a cause and a location of failure occurring in the image display wiring line of the liquid crystal display device 100, based on the notification results, and thus the user can take necessary measures such as communicating to a repair shop.

Further, the closed circuit 30 is a circuit independent of a circuit for displaying an image. Thus, even when the liquid crystal display device 100 displays an image, the MCU 420 can notify the user when the MCU 420 detects an abnormality occurring in the closed circuit 30.

Furthermore, the MCU 420 has a communication function of transmitting, from the output terminal DO to the outside, a notification that the voltage value Vx of the closed circuit 30 falls outside the normal range Va to Vb. In this way, the user can easily know that an abnormality occurs in at least any of the connection portions 50a to 50c or the wiring line of the FPC 300 by receiving a notification for notifying the user of the abnormality from the liquid crystal display device 100. Further, the user can know a time at which a connection failure or an abnormality in a wiring line occurs in the liquid crystal display device 100 and a situation at the time in detail later by analyzing a log that is recorded in the recording medium 440 connected to the MCU 420 and indicates a voltage value falling outside the normal range Va to Vb.

1.5 First Modified Example

Figure 7:
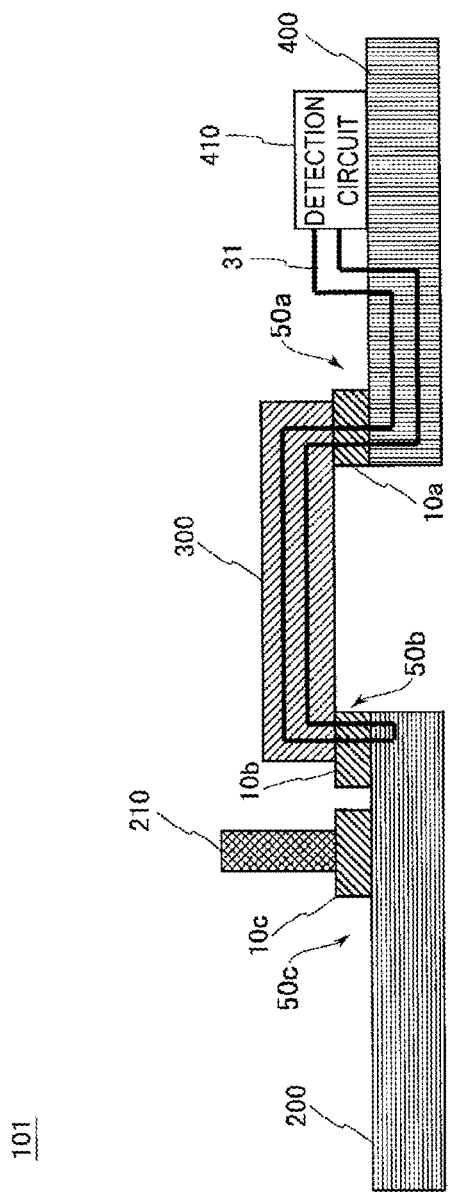
FIG. 7 is a diagram illustrating a wiring line of a closed circuit provided in a liquid crystal display device according to a first modified example of the first embodiment.

FIG. 7 is a diagram illustrating a wiring line of a closed circuit 31 provided in a liquid crystal display device 101 according to a first modified example. As illustrated in FIG. 7, in the present modified example, the closed circuit 31 is a circuit that extends to a substrate 400, an FPC 300, and a liquid crystal panel 200 in order from a detection circuit 410 side, and then returns to the substrate 400 again by turning back inside the liquid crystal panel 200. Thus, in contrast to the closed circuit 30, the closed circuit 31 does not extend to a connection portion 50c that connects the liquid crystal panel 200 and a driver 210. Thus, an MCU 420 can detect a connection failure in a connection portion 50a that connects a wiring line of the substrate 400 and a wiring line of the FPC 300 and a connection portion 50b that connects the wiring line of the FPC 300 and a wiring line of the liquid crystal panel 200, and can detect disconnection or a short circuit in the wiring line of the FPC 300 by determining a voltage value of the closed circuit 32 and comparing the determined voltage value with a normal range Va-Vb. However, a connection failure in the connection portion 50c cannot be detected. Note that a configuration of the liquid crystal display device 101, a configuration of the detection circuit 410, and a relationship between a value of voltage applied to the closed circuit 30 shown in FIG. 6 and a connection state of each of the connection portions are the same as those described in the embodiment described above, and thus the description thereof will be omitted.

1.6 Second Modified Example

Figure 8:
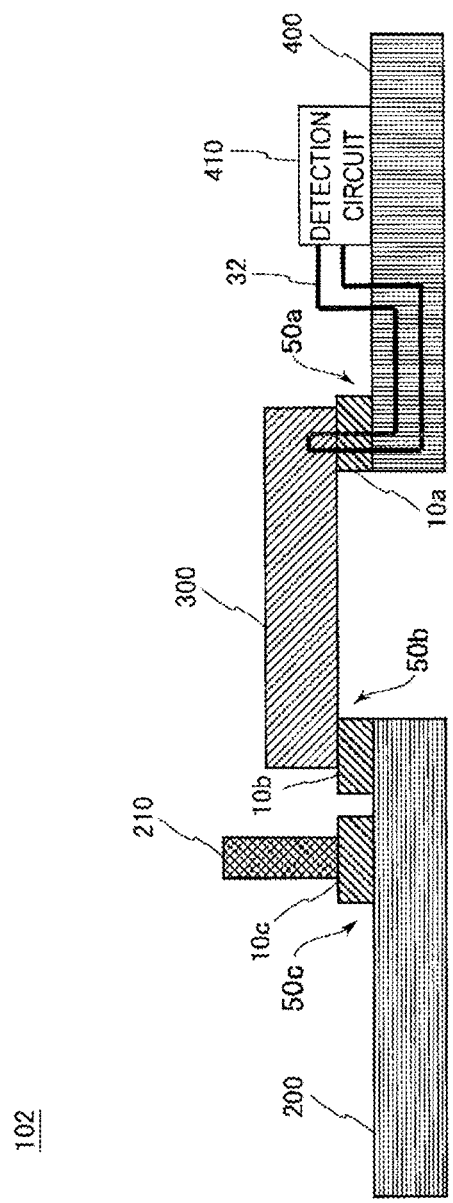
FIG. 8 is a diagram illustrating a wiring line of the closed circuit provided in the liquid crystal display device according to the first modified example of the first embodiment.

FIG. 8 is a diagram illustrating a wiring line of a closed circuit 32 provided in a liquid crystal display device 102 according to a second modified example. As illustrated in FIG. 8, in the present modified example, the closed circuit 32 is a circuit that extends to a substrate 400 and an FPC 300 in order from a detection circuit 410 side, and then returns to the substrate 400 again by turning back inside the FPC 300. Thus, in contrast to the closed circuit 30, the closed circuit 32 does not extend to a connection portion 50b that connects a liquid crystal panel 200 and the FPC 300 and a connection portion 50c that connects the liquid crystal panel 200 and a driver 210. Thus, an MCU 420 can detect a connection failure in a connection portion 50a that connects a wiring line of the substrate 400 and a wiring line of the FPC 300 by determining a voltage value of the closed circuit 32 and comparing the determined voltage value with a normal range Va-Vb. However, a connection failure in the connection portions 50b and 50c, and disconnection or a short circuit in the wiring line of the FPC 300 cannot be detected. Note that a configuration of the liquid crystal display device 102, a configuration of the detection circuit 410, and a relationship between a value of voltage applied to the closed circuit 30 illustrated in FIG. 6 and a connection state of each of the connection portions are the same as those described in the embodiment described above, and thus the description thereof will be omitted.

1.7 Third Modified Example

The closed circuits provided in the liquid crystal display devices 100, 101, and 102 described above are the closed circuit 30 (also referred to as a "first closed circuit"), the closed circuit 31 (also referred to as a "second closed circuit"), and the closed circuit 32 (also referred to as a "third closed circuit") that are provided independently of each other. In other words, only one type of the closed circuit is provided in each of the liquid crystal display devices 100, 101, and 102. Since both of the closed circuit 30 and the closed circuit 31 include the plurality of connection portions, it is difficult to identify which connection portion a connection failure occurs in when a determined voltage value is detected to be increased, for example. Thus, in the present modified example, three types of the closed circuits 30 to 32 are provided in one liquid crystal display device in parallel, and a value of voltage applied to each of the closed circuits 30 to 32 is determined. As a result, when a rise in voltage value is not detected in the closed circuit 31 and the closed circuit 32, but a rise in voltage value is detected in only the closed circuit 30, it is determined that a connection failure occurs in the connection portion 50c. Similarly, with the closed circuit 31 and the closed circuit 32 being provided in parallel, when a rise in voltage value is detected in only the closed circuit 31, it is determined that a connection failure occurs in the connection portion 50b. Further, when a rise in voltage value is detected in all of the closed circuits 30 to 32 provided in parallel, it is determined that a connection failure occurs in the connection portion 50a. In such a manner, in a case where two or three types of the closed circuits of the closed circuits 30 to 32 are provided in the liquid crystal display device in parallel, which connection portion of the connection portions 50a to 50c a connection failure occurs in can be identified.

2. Second Embodiment

Figure 9:
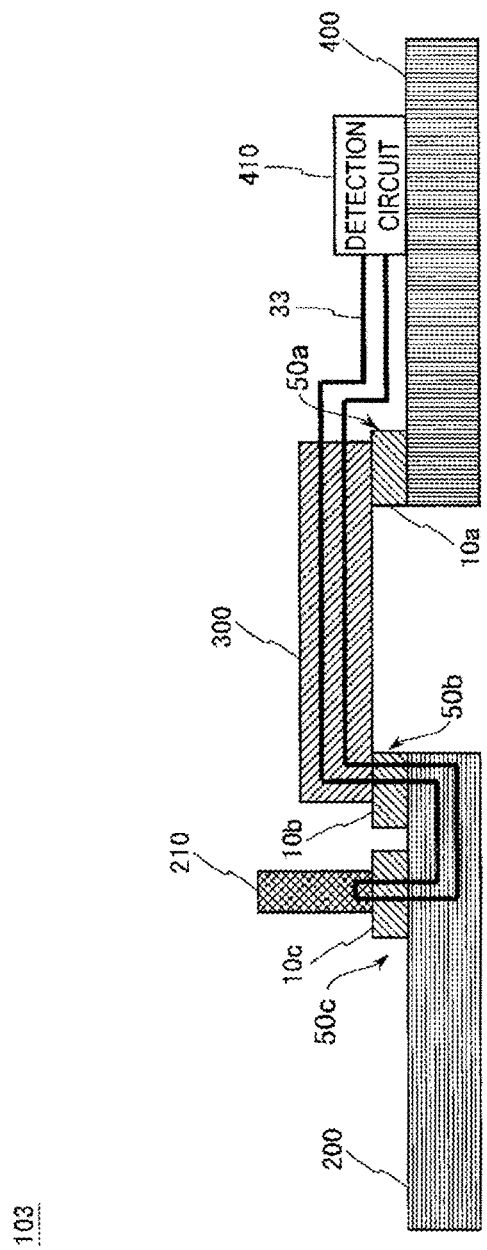
FIG. 9 is a diagram illustrating a wiring line of a closed circuit formed in a liquid crystal display device according to a second embodiment.

FIG. 9 is a diagram illustrating a wiring line of a closed circuit 33 provided in a liquid crystal display device 103 according to a second embodiment. As illustrated in FIG. 9, the closed circuit 33 is a circuit that extends to an FPC 300, a liquid crystal panel 200, and a driver 210 in order from a detection circuit 410 side, and then returns to the FPC 300 again by turning back inside the driver 210. In such a manner, in contrast to the closed circuit 30 according to the first embodiment, the closed circuit 33 is formed from the FPC 300 without being formed in a substrate 400, and thus the closed circuit 33 does not extend through a connection portion 50a. Thus, when a voltage value of the closed circuit 33 is detected to be increased, an MCU 420 determines that a connection failure occurs in at least any of a connection portion 50b and a connection portion 50c included in the closed circuit 33, or a wiring line formed on the FPC 300 is disconnected. Further, when a voltage value decreases, it is determined that the wiring line formed on the FPC 300 is short-circuited. Note that a configuration of the liquid crystal display device 103, a configuration of the detection circuit 410, and a relationship between a value of voltage applied to the closed circuit 33 shown in FIG. 6 and a connection state of each of the connection portions are the same as those described in the first embodiment, and thus the description thereof will be omitted.

2.1 Modified Example

Figure 10:
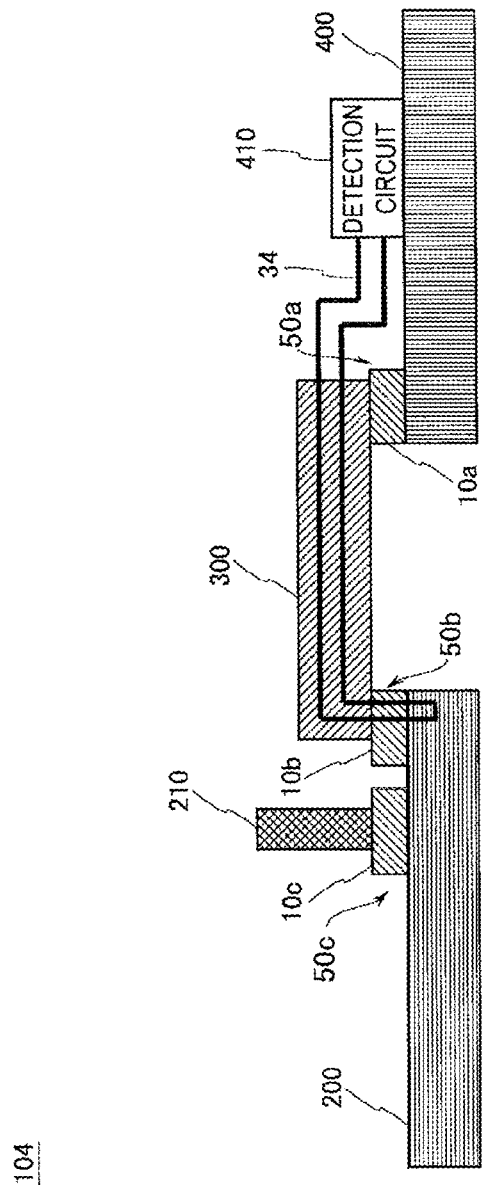
FIG. 10 is a diagram illustrating a wiring line of a closed circuit formed in a liquid crystal display device according to a modified example of the second embodiment.

FIG. 10 is a diagram illustrating a wiring line of a closed circuit 34 provided in a liquid crystal display device 104 according to a modified example. As illustrated in FIG. 10, in the present modified example, the closed circuit 34 is a circuit that extends to an FPC 300 and a liquid crystal panel 200 in order from a detection circuit 410 side, and then returns to the FPC 300 again by turning back inside the liquid crystal panel 200, and does not extend through a connection portion 50a that connects a substrate 400 and the FPC 300 and a connection portion 50c that connects the liquid crystal panel 200 and a driver 210. Thus, when a voltage value of the closed circuit 34 is detected to be increased, an MCU 420 determines that a connection failure occurs in a connection portion 50b included in the closed circuit 34, or a wiring line formed on the FPC 300 is disconnected.

3. Third Embodiment

Figure 11:
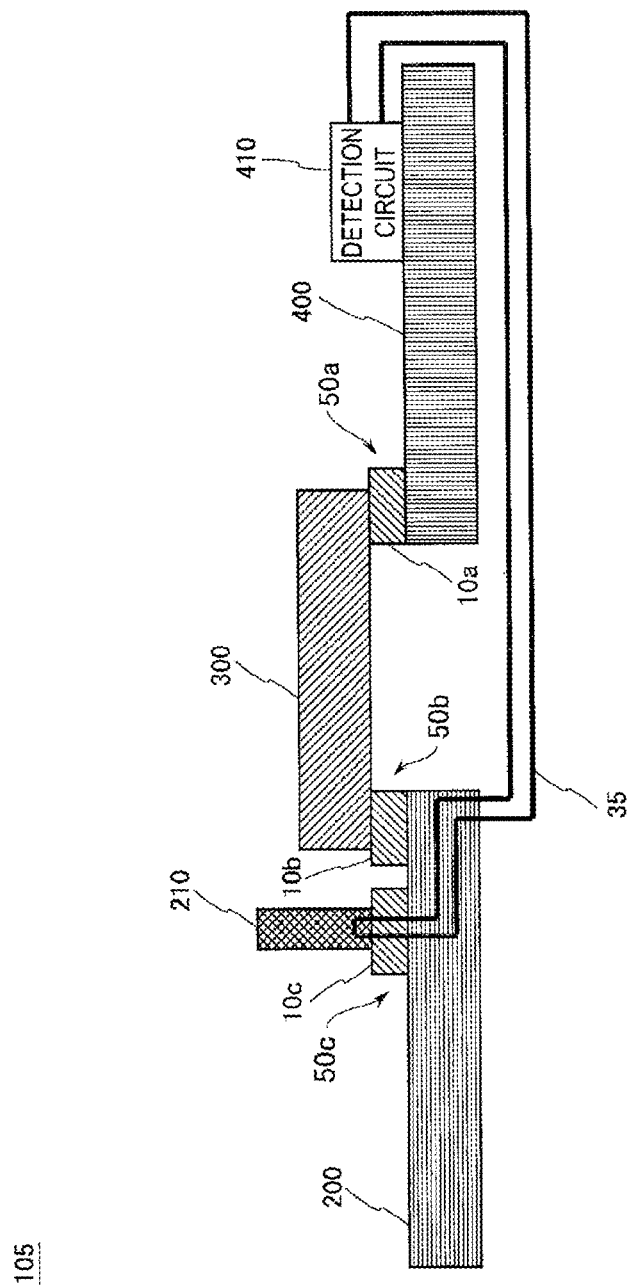
FIG. 11 is a diagram illustrating a wiring line of a closed circuit formed in a liquid crystal display device according to a third embodiment.

FIG. 11 is a diagram illustrating a wiring line of a closed circuit 35 provided in a liquid crystal display device 105 according to a third embodiment. As illustrated in FIG. 11, the closed circuit 35 is a circuit that extends to a liquid crystal panel 200 and a driver 210 in order from a detection circuit 410 side, and then returns to the liquid crystal panel 200 again by turning back inside the driver 210. In such a manner, the closed circuit 35 is formed only on the liquid crystal panel 200 without being formed on a substrate 400 and an FPC 300. In this case, the closed circuit 35 extends through only a connection portion 50c, and thus, when a voltage value of the closed circuit 35 is detected to be increased, an MCU 420 determines that a connection failure occurs in the connection portion 50c included in the closed circuit 35. In this case, since the closed circuit 35 is not formed on the FPC 300, disconnection or a short circuit in a wiring line of the FPC 300 cannot be detected. Note that a configuration of the liquid crystal display device 105, a configuration of the detection circuit 410, and a relationship between a value of voltage applied to the closed circuit 35 shown in FIG. 6 and a connection state of each of the connection portions are the same as those described in the first embodiment, and thus the description thereof will be omitted.

4. Fourth Embodiment

In the present embodiment, in contrast to each of the embodiments described above, a current value of current flowing through the closed circuit 30 is measured by the detection circuit 410. A configuration of a liquid crystal display device according to the present embodiment is the same as that of the first embodiment, and thus the description and drawings thereof will be omitted. Further, a configuration of the detection circuit 410 including the pseudo resistor Rx representing the closed circuit 30 is also the same as that of the first embodiment illustrated in FIG. 5, and thus the description thereof will be omitted. Note that, in the present embodiment, the closed circuit 30 illustrated in FIG. 4 will be described, but the same can also be applied to the closed circuits 31 to 35 illustrated in FIGS. 7 to 11.

When a connection failure occurs in at least any of the connection portions 50a to 50c included in the closed circuit 30, or a wiring line of the FPC 300 is disconnected or short-circuited, a current value of current flowing through the closed circuit 30 changes. Thus, by measuring a change in current value, a connection failure in the connection portions 50a to 50c included in the closed circuit 30 can be detected. Note that, as described in the first embodiment, a current value of current flowing through the closed circuit 30 is determined by a voltage applied to the internal resistor R1 having a known resistance value being input to the voltage measurement terminal VD of the MCU 420.

Figure 12:
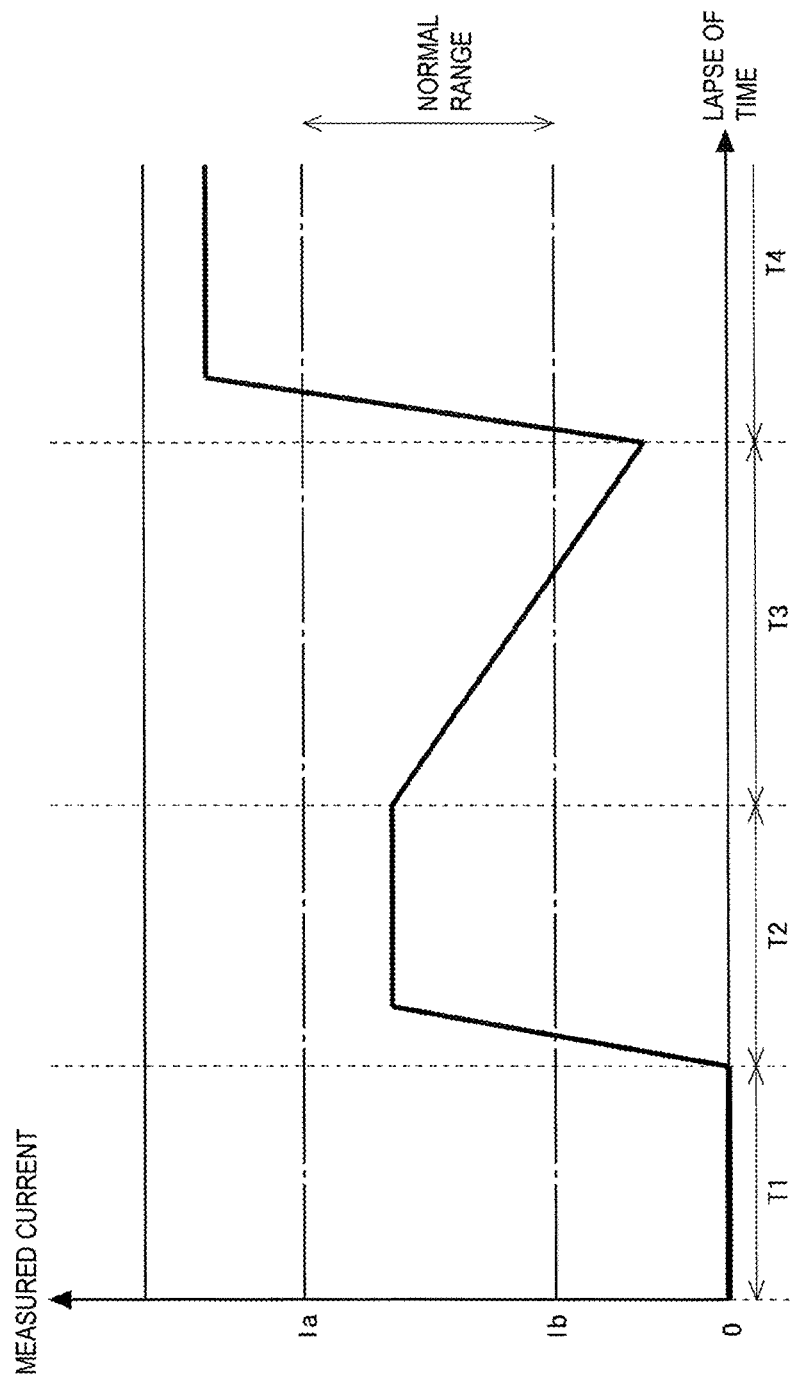
FIG. 12 is a diagram showing a time change in a value of current flowing through the closed circuit.

4.1 Relationship Between Change in Current Value and Failure Mode of Closed Circuit FIG. 12 is a diagram showing a time change in a value of current flowing through the closed circuit 30. Note that, similarly to a case of a voltage value, a current value of the closed circuit 30 varies within a certain range even when a connection state of the connection portions 50a to 50c is normal. Thus, in FIG. 12, when a range between an upper limit value Ia and a lower limit value Ib is a normal range Ia-Ib and a value of current flowing through the closed circuit 30 falls within the normal range Ia-Ib, the MCU 420 determines that a connection state of the closed circuit 30 is normal. In contrast, when a current value becomes greater than the upper limit value Ia, the MCU 420 determines that wiring lines of the FPC 300 are short-circuited due to foreign matter entering between the wiring lines. Further, when a current value becomes less than the lower limit value Ib, the MCU 420 determines that a connection failure occurs in the closed circuit 30, or the wiring line of the FPC 300 is disconnected or is about to be disconnected.

Four periods T1 to T4 will be described with reference to FIG. 12. First, in the period T1, a current value of the closed circuit 30 is zero. This results in determination that at least any of the respective connection portions 50a to 50c between the FPC 300 and the substrate 400, the FPC 300 and the liquid crystal panel 200, and the liquid crystal panel 200 and the driver 210 is disconnected or the wiring line of the FPC 300 is disconnected, and thus the closed circuit 30 is not formed. In this way, it is estimated that disconnection also occurs in the image display wiring line.

In the period T2, the current value of the closed circuit 30 is in the normal range Ia-Ib between the upper limit value Ia and the lower limit value Ib. This results in determination that a connection failure does not occur in any of the connection portions 50a to 50c between the FPC 300 and the substrate 400, the FPC 300 and the liquid crystal panel 200, and the liquid crystal panel 200 and the driver 210, and the wiring line of the FPC 300 is not disconnected or short-circuited. In this way, it is estimated that the image display wiring line is also normal.

In the period T3, the current value of the closed circuit 30 gradually decreases, and decreases beyond the lower limit value Ib of the normal range. This results in determination that a connection state becomes worse in at least any of the connection portions 50a to 50c during operation of the liquid crystal display device 100 or the wiring line of the FPC 300 is about to be disconnected, and there is a possibility that disconnection may occur in the future. In this way, it is estimated that there is a possibility that disconnection may also occur in the image display wiring line in the future.

In the period T4, the current value of the closed circuit 30 is greater than the upper limit value Ia of the normal range. This results in determination that wiring lines formed on the FPC 300 are short-circuited therebetween due to adhesion of foreign matter or the like. In this way, it is estimated that a short circuit also occurs in the image display wiring line.

In such a manner, similarly to a case of a value of voltage applied to the closed circuit 30, a connection state of the connection portions 50a to 50c can be determined by a current value of current flowing through the closed circuit 30. In this way, a state of the image display wiring line can be estimated.

4.2 Effects

According to the present embodiment, even during operation of the liquid crystal display device, the MCU 420 can estimate a cause and a location of failure occurring in the image display wiring line of the liquid crystal display device 100 by determining a value of current flowing through the closed circuit 30, determining whether the determined current value falls within a normal range, and notifying a user. In this way, the user can take necessary measures such as communicating to a repair shop.

5. Others

In such a manner, as a method for detecting occurrence of a connection failure in the connection portion of the closed circuit 30, or disconnection or a short circuit in the wiring line of the FPC 300, there are a method for determining a value of voltage applied to the closed circuit 30 and a method for determining a value of current flowing through the closed circuit 30. Furthermore, the disclosure is not limited to the methods, and other methods may be used as long as a resistance value of the closed circuit 30 can be determined directly or indirectly. Thus, a current value, a voltage value, and the like determined for determining a state of the closed circuit 30 may be collectively referred to as a "measured value of an electrical signal indicating a state of the closed circuit".

Further, in the above-described embodiments and each of the modified examples, a case where the liquid crystal display device is attached to an automobile is described as an example. However, the present embodiment is not limited thereto, and a product to which the liquid crystal display device can be attached may be used. Particularly, in a case where a place where the liquid crystal display device is attached is small, and thus a product is difficult to remove, a greater effect can be obtained. Further, in each of the above-described embodiments and the modified example thereof, the liquid crystal display device is described, but the same can also be applied to an organic electro luminescence (EL) display device.

Although the present invention has been described in detail above, the above description is exemplary in all respects and is not limiting. It is understood that numerous other modifications or variations can be made without departing from the scope of the present invention.

The invention claimed is:

1. A display device, comprising:
   a display panel in which a display portion where a plurality of pixel forming sections are formed and a drive circuit configured to drive the plurality of pixel forming sections are disposed;
   a rigid substrate on which an electronic component configured to generate a signal necessary for operating the drive circuit, based on an external image signal, is mounted; and
   a flexible printed circuit disposed between the display panel and the rigid substrate, and configured to electrically connect a wiring line formed on the display panel and a wiring line formed on the rigid substrate,
   wherein the display device further includes
   a closed circuit formed extending through one, adjacent two, or all connection portions of a first connection portion, a second connection portion, and a third connection portion that electrically connect a wiring line of the rigid substrate and a wiring line of the flexible printed circuit, a wiring line of the flexible printed circuit and a wiring line of the display panel, and a wiring line of the display panel and a terminal of the drive circuit by an anisotropic conductive film sandwiched between electrodes formed on each of the wiring lines and the terminal and thermally pressure-bonded, and
   a detection circuit configured to determine a measured value of an electrical signal indicating a connection state of the closed circuit by applying voltage having a predetermined value to a disconnection detection circuit connected to the closed circuit, and
   the detection circuit determines, based on the measured value, whether a state of the closed circuit is in a normal range being preset, and notifies an external device in a case where the detection circuit detects that the measured value is not in the normal range.

2. The display device according to claim 1,
   wherein, in the disconnection detection circuit in which an internal resistor having a known resistance value and the closed circuit are connected in series, the measured value is a value of voltage applied to the closed circuit in a case where the voltage having the predetermined value is applied to the disconnection detection circuit, and the detection circuit determines a connection state of the closed circuit, based on the value of the voltage applied to the closed circuit.

3. The display device according to claim 2,
   wherein the detection circuit determines that a wiring line formed on the flexible printed circuit is short-circuited in a case where the value of the voltage applied to the closed circuit is less than a lower limit value of the normal range, and determines that at least any of the connection portions included in the closed circuit of the first to third connection portions or a wiring line formed on the flexible printed circuit is disconnected or is about to be disconnected in a case where the value of the voltage is greater than an upper limit value of the normal range.

4. The display device according to claim 1,
   wherein, in the disconnection detection circuit in which an internal resistor having a known resistance value and the closed circuit are connected in series, the measured value is a value of current flowing through the closed circuit in a case where the voltage having the predetermined value is applied to the disconnection detection circuit, and the detection circuit determines a connection state of the closed circuit, based on the value of the current flowing through the closed circuit.

5. The display device according to claim 4,
   wherein the detection circuit determines that at least any of the connection portions included in the closed circuit of the first to third connection portions or a wiring line formed on the flexible printed circuit is disconnected or is about to be disconnected in a case where the value of the current flowing through the closed circuit is less than a lower limit value of the normal range, and determines that the wiring line formed on the flexible printed circuit is short-circuited in a case where the value of the current is greater than an upper limit value of the normal range.

6. The display device according to claim 1,
   wherein the closed circuit is a circuit that extends from the rigid substrate to the flexible printed circuit through the first connection portion, and returns to the rigid substrate from the flexible printed circuit.

7. The display device according to claim 6,
   wherein the closed circuit is a circuit that further extends from the flexible printed circuit to the display panel through the second connection portion, and returns to the rigid substrate from the display panel.

8. The display device according to claim 7,
   wherein the closed circuit is a circuit that further extends from the display panel to the drive circuit through the third connection portion, and returns to the rigid substrate from the drive circuit.

9. The display device according to claim 1,
   wherein the closed circuit is a circuit that extends from the flexible printed circuit to the display panel through the second connection portion, and returns to the flexible printed circuit from the display panel.

10. The display device according to claim 9,
    wherein the closed circuit is a circuit that further extends from the display panel to the drive circuit through the third connection portion, and returns to the display panel from the drive circuit.

11. The display device according to claim 1,
    wherein the closed circuit is a circuit including at least two or more closed circuits of a first closed circuit that extends from the rigid substrate to the drive circuit through the first connection portion, the flexible printed circuit, the second connection portion, the display panel, and the third connection portion, and returns to the rigid substrate from the drive circuit, a second closed circuit that extends from the rigid substrate to the display panel through the first connection portion, the flexible printed circuit, and the second connection portion, and returns to the rigid substrate from the display panel, and a third closed circuit that extends from the rigid substrate to the flexible printed circuit through the first connection portion, and returns to the rigid substrate from the flexible printed circuit.

12. The display device according to claim 1,
    wherein the detection circuit outputs occurrence of an abnormality to the external device in a case where the detection circuit detects that the measured value of the electrical signal is not in the normal range.

13. The display device according to claim 1,
    wherein the detection circuit includes a recording medium configured to record a log configured to notify that an abnormality occurs in a case where the detection circuit detects that the measured value of the electrical signal is not in the normal range.

* * * * *